(12) United States Patent
Schmidt

(10) Patent No.: US 11,437,667 B2
(45) Date of Patent: Sep. 6, 2022

(54) BATTERY ASSEMBLY METHOD FOR PROVIDING A BATTERY ARRANGEMENT AND BATTERY ARRANGEMENT

(71) Applicant: AUDI AG, Ingolstadt (DE)

(72) Inventor: Johann-Anton Schmidt, Titting-Petersbuch (DE)

(73) Assignee: AUDI AG, Ingolstadt (DE)

( * ) Notice: Subject to any disclaimer, the term of this patent is extended or adjusted under 35 U.S.C. 154(b) by 234 days.

(21) Appl. No.: 16/735,945

(22) Filed: Jan. 7, 2020

(65) Prior Publication Data
US 2020/0243928 A1 Jul. 30, 2020

(30) Foreign Application Priority Data

Jan. 29, 2019 (DE) ...................... 10 2019 201 077.6

(51) Int. Cl.
*H01M 10/655* (2014.01)
*H01M 10/613* (2014.01)
(Continued)

(52) U.S. Cl.
CPC ....... *H01M 10/655* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS

| 2011/0052960 A1* | 3/2011 | Kwon | H01M 10/0481 429/120 |
| 2011/0200862 A1* | 8/2011 | Kurosawa | H01M 10/653 429/120 |

(Continued)

FOREIGN PATENT DOCUMENTS

| DE | 102012012663 A1 * | 12/2013 | ............ F28F 21/065 |
| DE | 10 2012 018 045 A1 | 3/2014 | |

(Continued)

OTHER PUBLICATIONS

Kellner et al. DE 102017110978 Machine translation (Year: 2017).*

(Continued)

*Primary Examiner* — Ula C Ruddock
*Assistant Examiner* — Anna Korovina
(74) *Attorney, Agent, or Firm* — Maier & Maier, PLLC

(57) ABSTRACT

A battery assembly method for providing a battery arrangement having at least one battery module, a cooling means, and a frame. For attaching the at least one battery module on a first side of the cooling means, the battery module is affixed in a module support region of the first side without the frame being attached to the cooling means, wherein the cooling means comprises a separating element which provides the first side, which element has an edge region and a transition region which connects the edge region to the module support region, wherein the separating element is elastically flexible, at least in the transition region, and wherein, after affixing the battery module, the frame is mounted such that at least a portion of the frame rests on the edge region of the separating element.

20 Claims, 4 Drawing Sheets

(51) Int. Cl.
  *H01M 50/20* (2021.01)
  *H01M 50/204* (2021.01)
  *H01M 10/625* (2014.01)

(52) U.S. Cl.
  CPC ......... *H01M 50/20* (2021.01); *H01M 50/204* (2021.01); *H01M 2220/20* (2013.01)

(56) References Cited

U.S. PATENT DOCUMENTS

2018/0026243 A1* 1/2018 Stojanovic ........ H01M 10/6566
                                                                          429/99
2018/0337374 A1* 11/2018 Matecki .................. B60K 1/04

FOREIGN PATENT DOCUMENTS

| DE | 10 2013 021 549 A1 | 6/2015 |
| DE | 10 2016 009 972 A1 | 2/2017 |
| DE | 10 2017 208 733 A1 | 11/2018 |
| DE | 102017110978 A1 * | 11/2018 |
| WO | 2013171205 A1 | 11/2013 |

OTHER PUBLICATIONS

Bitterlich et al. DE 102012012663 Machine Translation (Year: 2012).*

Search Report dated Dec. 20, 2019 in corresponding German Application No. 10 2019 201 077.6; 14 pages including partial machine-generated English-language translation.

* cited by examiner (SdT)

BATTERY ASSEMBLY METHOD FOR PROVIDING A BATTERY ARRANGEMENT AND BATTERY ARRANGEMENT

FIELD

The disclosure relates to a battery assembly method for providing a battery arrangement having at least one battery module, a cooling means for cooling the at least one battery module, and a frame, wherein the at least one battery module is attached to a first side of the cooling means and the frame is at least attached to the at least one battery module. The disclosure also includes a battery arrangement for a motor vehicle.

BACKGROUND

Battery arrangements for motor vehicles known from prior art, particularly high-voltage batteries, typically comprise a battery housing in which each of the battery modules is received. This battery housing may include a housing bottom and a frame, which, as it were, provides the side walls of the housing, as well as optionally other separating walls to separate the receiving areas of each of the battery modules from each other and to provide a fastening option for the respective battery modules. A cooling means for cooling the battery modules is typically attached to the bottom side of the battery bottom. The cooling means itself may also provide the housing bottom.

FIG. 1 shows an example of such a battery arrangement 10 according to prior art, having a battery module 12, a housing bottom 14, which may at the same time represent a cooling means 16, and a frame 18 to which the housing bottom 14 is attached using fastening elements 20, typically, but not exclusively, screws. To allow good heat dissipation from the battery module 12 to the cooling means 16, the battery module 12 should be aligned as flush as possible with the housing bottom 14. To avoid air gaps, which have a thermally insulating effect, between the battery module 12 or its bottom side, respectively, and the housing bottom 14, a so-called gap filler 22, or alternatively a so-called gap pad, is typically inserted between the battery module 12 and the housing bottom 14. Such gap pads are a type of bags filled with a gelled substance. Such a gap filler 22 typically is a relatively viscous thermal grease. It can for example first be applied to the housing bottom 14, then the battery module 12 can be inserted and pressed against the housing bottom 14. Pressing the battery module 12 against the bottom is indicated in FIG. 1 by the arrow 24. This typically very high pressing force 24 causes the gap filler 22 to spread between the battery module 12 and the housing bottom 14 in that the filler is pressed outwards, which is illustrated by the arrows 26.

This procedure, however, results in numerous problems. First, the housing bottom 14 is typically not even, which is illustrated in FIG. 1, for example, by a slight convexity of the housing bottom 14. This is the reason why the described gap filler 22 is needed, since without this gap filler 22, air bridges would occur between the bottom of the battery module 12, which is typically uneven, and the uneven housing bottom 14. Such gap fillers 22, however, have the disadvantage that, on the one hand, they are relatively expensive and result in a significantly greater weight of the battery arrangement 10, on the other hand their thermal conductivity is not as good as that of metals, for example, such that thick gap filler layers result in a reduction of cooling efficiency. If the gap filler layer is also not uniform in thickness, undesirable inhomogeneities in cooling the battery module 12 can result. Another big disadvantage of this arrangement concept is that difficult screw joint cases between the battery module 12 and the frame 18 for attaching the battery module 12 to the frame 18 cannot be reliably implemented without additional tolerance compensating elements. Similar fastening issues occur when using other fastening means. Due to the undesirable convexities of the housing bottom 14, the screw-on flange 12a of the battery module 12 cannot be brought into abutment with the corresponding screw-on flange 18a of the frame 18; instead, there will always be more or less big gaps. To compensate for these gaps, the tolerance compensating elements mentioned above are used, which are arranged between these flanges 12a, 18a and which compensate the tolerances between the two flanges 12a, 18a when they are screw-connected. These additional elements once again result in extra cost and weight. It would therefore be desirable to have a more efficient battery assembly method and a more efficient battery arrangement.

DE 10 2016 009 972 A1 describes a block of cells with a cell stack from a plurality of individual battery cells, which are stacked with separating walls placed there-between. The separating walls are configured in the stacking direction with integrated plate-shaped compensating parts which can be plastically formed to a specific thickness to compensate for tolerance-related variation in length. The use of compensating parts is unavoidable here as well to provide compensation for tolerances. Furthermore, it is not described herein how efficient attachment to a cooling means and fastening battery modules to the frame can be implemented.

WO 2013/171205 A1 describes a cooling device for a vehicle battery comprising at least one coolant line and at least one separate pressing element which is elastic in order to press the coolant line against an outside of the vehicle battery. Pressing the cooling means against the outside of the battery requires complex pressing means which require much installation space.

Furthermore, DE 10 2013 021 549 A1 describes a high-voltage battery having a block of cells which includes a multitude of individual battery cells which are clamped to each other. Respective cooling plates are arranged between the individual battery cells. The individual battery cells can be flatly affixed to two opposite sides of the cell holder or the cooling plate. However, this document also does not describe an connection option to a frame or cooling means through which a coolant flows.

Furthermore, DE 10 2012 018 045 A1 describes a battery having a stack of individual battery cells, each of which comprising an electrode stack which is welded in between two films. The individual battery cells are clamped between cell frames and stacked up to form the stack. Furthermore, contact tabs of the individual battery cells are connected to a cooling means, which is configured as an actively cooled plate, via an electrically insulating but heat conductive material, which may for example be configured as a casting compound or a thermally conductive film. But this results in the same disadvantages described for FIG. 1 with reference to the use of the gap filler.

SUMMARY

It is therefore the problem of the present invention to provide a battery assembly method and a battery arrangement which allow as simple and efficient as possible connection of a battery module to a cooling means and simplified attachment of the battery module to a frame.

This problem is solved by a battery assembly method and a battery arrangement having the features according to the disclosure. Advantageous embodiments of the invention are the subject matter of the disclosure.

In a battery assembly method according to the invention for providing a battery arrangement having at least one battery module, a cooling means for cooling the at least one battery module, and a frame, the at least one battery module is attached to a first side of the cooling means and the frame is at least attached to the at least one battery module. For attaching the at least one battery module on the first side of the cooling means, the at least one battery module is affixed on a module support region of the first side of the cooling means without the frame being attached to the cooling means. The cooling means further comprises a separating element which provides the first side, which element has an edge region and a transition region which connects the edge region to the module support region, wherein the separating element is elastically flexible, at least in the transition region. After affixing the at least one battery module, the frame is mounted on the arrangement of the at least one battery module and the cooling means such that at least a portion of the frame rests on the edge region of the separating element.

Since the edge region on which the portion of the frame rests is elastically flexibly connected to the module support region in which the battery module is arranged, compensation for tolerances can advantageously be provided, which advantageously allows attaching the battery module to the frame without needing any compensating elements and to implement said attachment, for example, by means of a screw joint in which, due to the compensation for tolerances advantageously provided, even difficult screw joint cases can be implemented without any intermediate elements or compensating elements. Although the attachment of the frame to at least one battery module is preferably implemented using screw joints, other fastening options or means may in addition or alternatively be applied, for example welding, particularly thermal welding, laser welding, spot welding, etc., and/or by using punch rivet elements and/or clamps or clamping elements or the like. Even for an attachment using such fastening means of options, the invention results in the same advantages of a particularly stable connection without the need for additional compensating elements. A particularly great advantage of the invention is that the battery module is affixed to a first side of the cooling means without the frame being attached to the cooling means. The frame can particularly be attached to the cooling means subsequently or not at all. This is based on the finding that, even if the first side of the cooling means is comprises irregularities or convexities, particularly in the battery module support region, such convexity or irregularity can easily be compensated by mounting the battery module onto this first side of the cooling means. Typically, the weight of the battery module itself is sufficient to even out a slightly de-formed cooling means. Otherwise, the battery module can also be mounted while applying a slight pressing force towards the cooling means. Since the cooling means is not attached to the frame, the cooling means can be smoothened, because the cooling means can expand in a direction perpendicular to the mounting direction when the battery module is mounted, as the cooling means is advantageously not fixed in its position due to being attached to the frame when the at least one battery module is mounted. If the cooling means, which may for example be configured as a thin cooling plate or cooling bottom, were attached to a frame on two opposite ends, a slight concavity or convexity could not even be compensated by applying a pressing force, since the ends of the cooling means are fixed and thus cannot give way in any direction. The invention, on the other hand, allows complete omission of the gap filler described above, and the battery module can for example be connected to the cooling means just by means of the heat conductive adhesive. Such adhesive layers can be considerably thinner in design than the typical gap filler layers, and in addition such an adhesive layer can be applied very homogeneously due to the flatness of the cooling means when the module is mounted onto the module support region and the flatness of the module bottom. This can help increase cooling efficiency significantly, since the heat conductivity of the thermal path from the battery module to the cooling means is significantly increased and also significantly more homogeneous across the entire bottom side of the battery module. Overall, this battery assembly method offers numerous advantages compared to prior art methods, because it allows significant savings of costs and weight and at the same time a significant increase in cooling efficiency due to eliminating the gap filler and the option to eliminate numerous compensating elements for implementing difficult screw joint cases between the battery modules and the frame.

The frame can on the one hand be an independent unit and provided separately as such. The battery arrangement provided by the battery assembly method can then be arranged on the motor vehicle, for example in an underfloor region of the motor vehicle. To this end, the battery arrangement may be attached to the motor vehicle by means of the frame. Before that or subsequently, the battery arrangement can be equipped on a top side, i.e. on the side of the frame facing away from the separating element, with a lid which can be arranged on and attached to the frame, and/or it can be equipped with an underrun protective device on the bottom side, which can be arranged on the bottom of the cooling means, particularly the separating element, and/or on the frame.

Alternatively, the frame can also represent a non-standalone unit but be part of the motor vehicle. The frame is preferably provided by a part of the vehicle structure of the underfloor of a motor vehicle. For example, parts of the frame can at the same time represent parts of a cross member or side rail of the motor vehicle. This has the major advantage that it allows saving additional weight and components. Here as well, the battery arrangement can be equipped on a top side, i.e. on the side of the frame facing away from the separating element or the motor vehicle structure of the underfloor providing said frame, with a lid which can be arranged on and attached to the frame, and/or it can be equipped with an underrun protective device on the bottom side, which can be arranged on the bottom of the cooling means, particularly the separating element, and/or on the frame. Particularly in this context, but also in general, mounting the frame onto the arrangement of the at least one battery module and the cooling means can also be interpreted as the frame being or remaining stationary during the mounting process, i.e. is not moved, and the arrangement of the at least one battery module and the cooling means is moved from below in the direction of the frame and arranged on it in such a manner that at least a portion of the frame rests on the edge region of the separating element.

The at least one battery module can generally include at least one battery cell, such as a lithium ion cell. The at least one battery module preferably includes multiple individual battery cells, which can be arranged in a battery stack. These individual battery cells preferably are prismatic cells. In principle, the battery cells may also be configured as pouch cells.

The cooling means for cooling the at least one battery module is preferably configured as an active cooling system and accordingly uses a cooling medium or coolant for dissipating the heat from the at least one battery module, which medium can generally be gaseous and/or liquid. The cooling means preferably comprises cooling ducts through which a coolant can flow. The cooling means can be configured as a cooling bottom, such that the separating element mentioned above at the same time provides a side wall of at least one cooling duct. In other words, the coolant is in direct contact with at least one region of the separating element. The cooling means may also comprise a separate cooling unit, which may for example be provided as a cooling plate with cooling ducts, wherein the cooling plate may be formed of thin metal sheets between which cooling ducts are molded in, wherein this cooling unit is once again arranged on the separating element, for example affixed to the same, and in this manner provides the cooling means. In both cases, the separating element provides separation of the high-voltage compartment and the wet compartment, which simplifies the overall structure because additional insulation and safety measures can be omitted.

The separating element is elastically flexible, at least in the transition region, as described above. This is to say that the separating element can be bent in this transition region if a respective force is applied, for example to the edge region of the separating element, and due to its flexibility it provides an elastic restoring force when bent, which opposes the deformation force caused by bending. Such elastic flexibility preferably not be understood as compressibility of the separating element; just that the separating element is configured to be bendable in the transition region while generating a respective restoring force. The separating element does not necessarily have to be elastically flexible in the transition region only; it may also be elastically flexible in the edge region and overall, for example in the module support region, however elastic flexibility in the module support region is not necessary.

It is particularly preferable that the separating element is provided as a separating sheet, that is, a metal sheet having a maximum thickness of one millimeter, for example a thickness in the range from 0.8 millimeters to 1.0 millimeters. Due to its configuration as such a thin metal sheet, for example made of aluminum or another metal or alloy, the elastic flexibility of the separating element described above can be achieved in a particularly simple and cost-effective manner, in this case overall and not just in the transition region. This is a particularly simple and cost-effective way to provide compensation for tolerances between the mounted frame and the at least one battery module to be able to implement difficult screw joint cases for screw joints between the battery module and the frame. The separating element may also be elastically flexible in the transition region in a different manner, for example, by comprising an elastically flexible synthetic material in the transition region. The frame mentioned above can provide the remaining part of the battery housing. Particularly, this frame can be configured as described at the outset and provide the side walls of the battery housing and further optional separating walls between receiving regions of multiple battery modules for attaching these battery modules. The battery arrangement preferably comprises multiple battery modules, such that the battery arrangement can for example provide a high-voltage battery for a motor vehicle, particularly an electric vehicle.

It is therefore an advantageous embodiment of the invention if multiple battery modules are affixed to the first side of the cooling means in the module support region, wherein the battery modules are fixed in their arrangement relative to each other before they are arranged in the module support region, and the fixed arrangement of the battery modules is mounted to the first side of the cooling means and affixed.

This allows a significantly more efficient battery assembly, since not each battery module must be mounted and attached individually. For example, all battery modules of the battery arrangement can in a first step be fixed in their arrangement relative to each other before they are mounted to the separating element. This battery arrangement can be gripped as a whole, for example by a suitable gripping and holding apparatus, and mounted onto the separating element, or an adhesive located on the separating element, respectively. The modules can be much easier connected to each other when they are not yet mounted onto the separating element with the adhesive located thereon. This also saves considerable time during battery assembly. Furthermore, associated module support regions may be provided for the respective battery modules.

It is further conceivable that all battery modules of the high-voltage battery are mounted onto a joint separating element, which is also configured in one piece, and affixed thereto. But it is also conceivable that first multiple individual arrangements of one or multiple battery modules and an associated cooling means are provided as described above, then the frame is mounted onto these multiple arrangements and attached to the respective battery modules. For example, a first row of battery modules having multiple battery modules which were fixed to each other in advance may be mounted onto an associated cooling means, particularly its separating element, and affixed thereto. Then a second row of battery modules may be mounted onto another cooling means, particularly its separating element, and affixed thereto, and so on. The rows of modules provided in this manner can then be positioned relative to each other in the desired arrangement, then the frame can be mounted onto these arrangements and screw-connected to the battery modules. This advantageously provides numerous flexible options for battery assembly, which can be adaptively selected based on respective requirements or situations.

In another advantageous embodiment of the invention, the frame, after being mounted, is screw-connected to the at least one battery module, such that in the screw-connected state of frame and the at least one battery module, a portion of the frame, which portion is integral with the frame, rests in direct contact against a portion of the at least one battery module. The portion of the battery module and the portion of the frame may for example once again be corresponding flanges, as described at the outset. These flanges, or generally the two parts of the battery module and the corresponding frame, may advantageously be brought into direct abutment by elastically bending the transition region of the separating element, since any tolerances or levels between these two parts to be screw-connected can advantageously be compensated by the elastically flexible configuration of the separating element in the edge or transition region. Advantageously, particularly stable and difficult screw joint cases can be implemented without additional auxiliary means such as compensating elements. A respective battery module may for example be screw-connected to the frame at four screw points.

Attaching the frame to the cooling means, particularly to the separating element, is generally not necessary, since the frame is attached to the battery modules and the battery modules themselves are firmly arranged on the cooling means via the adhesive bonds described. Nevertheless, the frame may be directly attached to the separating element to increase the stability of the arrangement. It is preferred, however, that after mounting the frame, the frame is screw-connected to the separating element in the edge region of the separating element only. Such attachment in the edge region only is completely sufficient, since the battery modules are firmly attached to the separating element anyway via the adhesive bond as described, and on the other hand the battery modules are firmly attached to the frame via the screw connections described. Advantageously, additional fastening means can be saved in this manner. But a particularly great advantage of attaching the frame to the separating element in the edge region only is that this allows to further increase cooling efficiency. If for example screw joints are implemented between the separating element or the cooling means, respectively, and the frame also in regions between the individual battery modules, the screws of these screw joints would additionally be cooled by the cooling means, whereby a great portion of the cooling capacity is lost and cannot be used for cooling the battery modules themselves. By attaching the frame in the edge region of the separating element only, the cooling capacity losses can advantageously be minimized and the cooling of the battery modules can be designed even more efficiently.

In another advantageous embodiment of the invention, the frame has struts which, in the state of the frame being mounted to the arrangement of the at least one battery module and the cooling means, extend vertically at least to the module support region of the separating element, wherein the struts have a widened portion on a side facing away from the separating element, which portion forms a projection which in a direction perpendicular to the extension of the struts projects from at least a portion of the at least one battery module and which comprises at least one screw hole, wherein a screw s screwed through the screw hole and at least partially into, or only through a portion of, the battery module for screw-connecting the frame to the at least one battery module. In other words, the struts described can have a T-shaped cross section and thus project at least partially beyond a portion of the battery module, particularly beyond an edge region of the respective battery module, which may for example at the same time provide a screw-on flange. This makes screw-connecting the frame to the respective battery modules particularly easy. Such a screw connection can be implemented in a particularly installation space saving manner. It is possible only because the at least one battery module is already mounted onto the cooling means or the separating element, respectively, when this arrangement is mounted from above. If the frame had first been attached to the cooling means or separating element, respectively, and the modules would be inserted later, as is common in prior art, it would not be possible to implement the struts described with such projections, since this would prevent the insertion of the modules.

In another advantageous embodiment of the invention, multiple screw holes are arranged in the projection at a specific spacing from each other in a longitudinal extension of the projection, wherein screw holes which are used for screw-connecting the frame to the battery modules are selected from the multiple screw holes depending on the respective module sizes of the battery modules and/or on an arrangement of the battery modules to each other. A flexible module grid can be provided by respective provisions in the hole pattern of the screw holes, which allows flexible, particularly different, module sizes. Particularly, the battery arrangement may comprise battery modules of different module sizes. Advantageously, battery modules having different properties can be used at the same time in one battery of battery modules. These battery modules can be very flexibly assigned to each other. Advantageously, this allows more flexibility when providing a high-voltage battery.

A particularly great advantage of the invention and its embodiments is that the battery assembly method described allows the use of significantly larger battery modules than has been possible so far. If a battery module, as is common in prior art, is mounted on a housing bottom already connected to the frame, particularly on a gap filler located thereon, the battery module must be pressed as strongly as possible against the housing bottom for the gap filler to distribute as evenly as possible between the module bottom and the housing bottom. At the same time, it must be ensured in the pressing process that the battery module itself is not damaged. Such pressing without damaging the battery module is all the more difficult the greater the battery module is, which is why typically no particularly large module sizes can be used in such an assembly method. But since the invention makes it possible to mount modules on the separating element without having to apply high pressing forces to the module, particularly without having to apply any additional pressing forces at all to the module, significantly larger battery modules can be used. This also increases manufacturing and assembly efficiency and at the same time increases the flexibility of applications.

In another advantageous embodiment of the invention, the separating element is uneven, such that the first side in the central module support region for the at least one battery module, which side is provided by the separating element, is elevated with respect to an edge region of said module support region. An elevation, as used herein, is a convexity or level change in the direction of the battery module to be arranged on the module support region or the battery module arranged on the module support region. The background is that the battery module is preferably configured such that it includes multiple individual battery cells, which themselves are enclosed in an angle iron frame. The battery modules may also be enclosed by other border elements. Such a border element or frame, respectively, encloses the battery module, particularly in its edge region, whereby the battery module is typically higher in the edge region than in a central region, or at least the central region of the bottom side of the battery module facing the cooling means is elevated with respect to the edge region of the battery module. Since the separating element has a corresponding geometrical configuration, namely its central support region is elevated with respect to the edge region of the support region, the shape of this separating element is optimally adapted to the shape of the bottom side of the battery module to be received. This once again allows homogeneous gap widths between the separating element and the battery module and accordingly homogeneous heat dissipation. Furthermore, specifically the elevation of the separating element in the central support region allows a substantial reduction of the gap between the battery module and the separating element in said central support region as well as in the central module support region, which allows a further increase in cooling efficiency. Such a partial elevation of the separating sheet in the central support region or in central support regions associated with the respective battery modules can easily be achieved by continuous embossment of the separating element.

If the battery module is on the other hand configured with a completely flat module bottom without an elevation in the central module support region, it is preferred that the separating element is flat as well.

In another advantageous embodiment of the invention, a spacer element having a maximum thickness of one millimeter is arranged or inserted between the edge region of a module bottom of the at least one battery module and the separating element. The reason is that the individual battery modules should be removable as easily as possible from the battery housing, either for servicing or after the service life of the high-voltage battery has expired. It should also be as easy as possible to separate the battery module from the cooling means, particularly from the separating element. This can be achieved, for example, using a commercially available wire saw for cutting through, for example, plastic, metal, glass, ceramics, etc. A battery module can then be encircled by such a wire saw or the wire thereof, respectively, then the wire can be pulled through between the module bottom and the separating element and in this way sever the adhesive bond between the module bottom and the separating element. To make the insertion of such a wire in the edge region of the respective module bottom easier, it is particularly advantageous that a spacer element between the module bottom and the separating element is provided at this exact spot. A spacer element having a maximum thickness of one millimeter is completely sufficient, since wire saws with wires having diameters of less than one millimeter can be implemented. Such a spacer element does not noticeably reduce cooling efficiency and at the same time allows particularly easy recycling of the battery as well as removal of modules for repair. Such a spacer element may in principle be made of any material, since typical wire saws are adapted for cutting through numerous different materials, including very hard materials such as metal. Accordingly, the material of the spacer element can be arbitrarily selected, as it were, and it can for example also be configured with good thermal conductivity characteristics, e.g. with metal or metal particles. Since the spacer element is very thin anyway and can span a region very small in diameter, a material can be selected which is particularly easy to cut through, such as a soft plastic or the like. This embodiment is particularly advantageous if the battery module has a module bottom which faces the cooling means after the at least one battery module has been arranged on the cooling means and which is uneven, such that the module bottom is elevated in a central region with respect to an edge region of the module bottom. As described above, such an elevation can be due to the geometry and arrangement of border elements for enclosing the battery cells. In such a case, the resulting gap widths between the module bottom in the edge region and the separating element can be very narrow, such that arranging a spacer element is particularly advantageous.

The invention further relates to a battery arrangement for a motor vehicle, wherein said battery arrangement has at least one battery module, a cooling means for cooling the at least one battery module, and a frame, wherein the at least one battery module is attached to a first side of the cooling means and the frame is at least attached to the at least one battery module. The at least one battery module is attached to the first side of the cooling means using an adhesive layer between the at least one battery module and a module support region of the first side of the cooling means, wherein the cooling means comprises a separating element providing the first side and having an edge region and a transition region which connects the edge region to the module support region, wherein the separating element is elastically flexible at least in the transition region, and the frame is mounted on the arrangement of the at least one battery module and the cooling means such that at least a portion of the frame rests on the edge region of the separating element.

Furthermore, the invention relates to a motor vehicle having a battery arrangement according to the invention.

The advantages described for the battery assembly method according to the invention and its embodiments apply likewise to the battery arrangement according to the invention. Furthermore, the steps of the method described in the context of the battery assembly method and its embodiments allow further development of the battery arrangement according to the invention by other corresponding features.

The motor vehicle according to the invention is preferably designed as a motor car, particularly a passenger car or truck, or as a bus or motorbike.

The invention also includes combinations of the features of the embodiments described.

BRIEF DESCRIPTION OF THE DRAWINGS

Exemplary embodiments of the invention will be described below.

DETAILED DESCRIPTION

Figure 1:
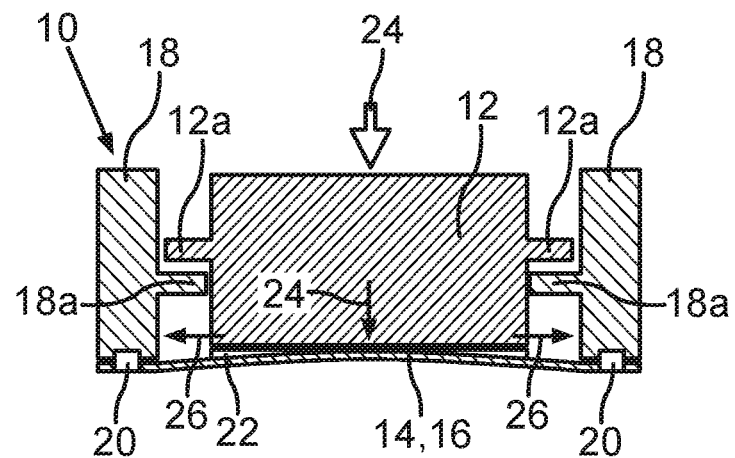
FIG. 1 shows a schematic view of a battery arrangement according to prior art.

The exemplary embodiments explained below are preferred embodiments of the invention. The components described in the exemplary embodiment represent individual features of the invention to be viewed separately, independently of each other, each of which further developing the invention independently. The disclosure therefore is to include other than the combinations of features of the embodiments shown. Furthermore, the embodiments described can be supplemented by other features of the features of the invention already described.

Like reference numerals in the figures designate elements having the same function.

Figure 2:
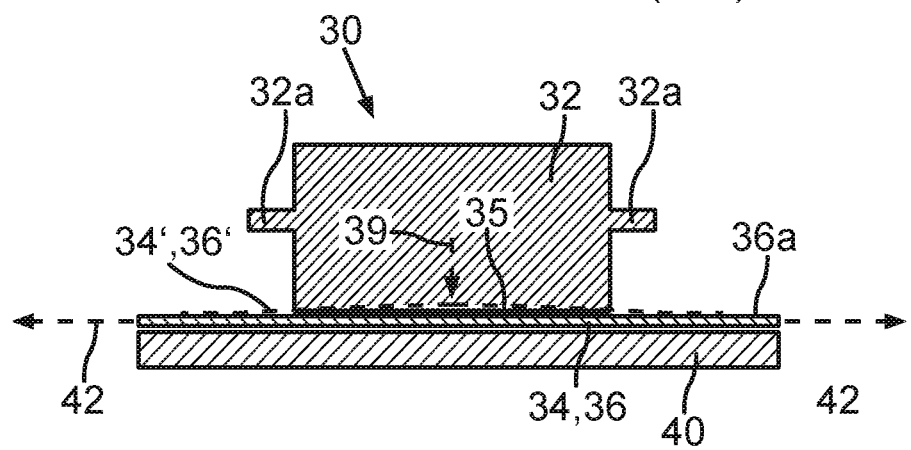
FIG. 2 shows a schematic view of a cooling means and a battery module mounted thereon for a battery arrangement according to an exemplary embodiment of the invention.
Figure 3:
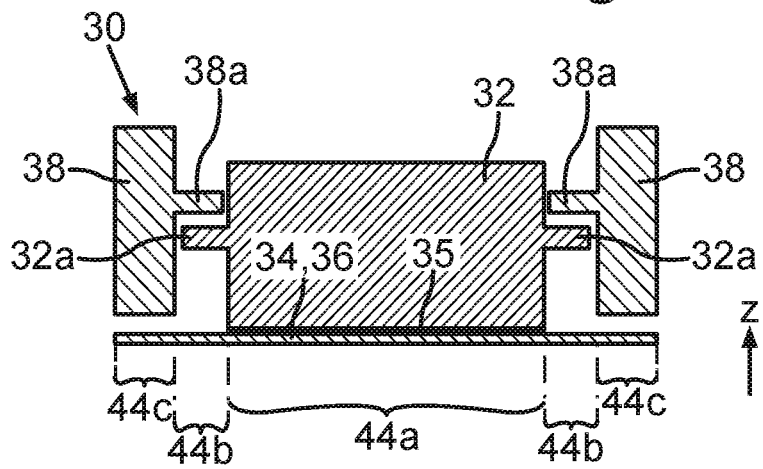
FIG. 3 shows a schematic view of the arrangement of cooling means and battery module from FIG. 2, now with the frame mounted onto this arrangement according to an exemplary embodiment of the invention.

FIG. 2 shows a schematic view of a part of a battery arrangement 30, particularly an arrangement of a battery module 32 and a cooling means 36, which at the same time provides a housing bottom 34 of a battery housing, for example. FIG. 3 shows the arrangement from FIG. 1, now with the frame 38 mounted thereon, which frame can also provide a portion of the battery housing, particularly the side walls of such a battery housing, as well as optional other separating walls between battery modules 32.

According to the invention, the battery module 32, particularly multiple battery modules 32 at the same time, are mounted onto the cooling means 36 and affixed thereto by means of an adhesive layer 35 before the frame 38 is attached. The frame 38 is particularly attached to the battery modules 32, as described in more detail below, wherein attachment of the frame 38 to the cooling means 36 is just optional. Since the frame 38 is not firmly connected to the cooling means 36 when the battery module 32 is mounted onto the cooling means 36 and affixed thereto, any convexities of the cooling means 36 at the time prior to mounting the battery module 32 can be compensated by mounting the battery module and optional slight pressing of the battery module 32, which is illustrated by the arrow 39. Such a convexity of the cooling means 36 prior to mounting the battery module 32 is schematically illustrated in FIG. 2 by the dashed line designated 34' and 36'. Furthermore, the cooling means 36 is preferably arranged on a flat support 40 when the battery module 32 is mounted, which supports the cooling means 36 from below when the battery module 32 is mounted onto the cooling means 36. This advantageously allows smoothening of the cooling means 36 without requiring much force when mounting the battery module 32, since the cooling means 36 can expand to all sides, as illustrated by the arrows 42. This expansion is made possible by the fact that the cooling means 36 is not positionally fixed and has the z tolerance of the cooling bottom frozen by attachment to the frame 38 when the battery module 32 is mounted. Since this allows achieving a particularly flat cooling bottom or flat surface of the cooling means 36, the gap filler 22 described at the outset can be completely omitted or it required quantity as well as its viscosity can be considerably reduced, which allows a significantly easier battery assembly in a more cost-effective and weight saving manner. Particularly, only the adhesive layer 35 described may be used for fastening the respective battery module 32 to the cooling means 36, for example, which layer is preferably heat conductive, having at least the heat conductivity that matches that of known gap fillers.

There are multiple options for configuring the cooling means 36, which will be described in more detail below. Particularly, the cooling means 36 has a separating element 44 (see for example FIG. 4), which provides the side 36a facing the battery module 32. This separating element 44, and accordingly this first side 36a of the cooling means 36, can be divided into multiple regions. A first region 44a of the separating element 44 represents a module support region onto which the battery module 32 is mounted or in which the battery module 32 is arranged or its bottom is affixed thereto by means of the adhesive layer 35. A second region represents a transition region 44b to an edge region 44c. The frame 38 of the battery arrangement (30) is mounted onto the arrangement of battery module 32 and cooling means 36 in such a manner that at least a portion of the frame 38, particularly that portion of the frame 38 which at the same time provides the outer walls of the battery housing, is brought into abutment with the edge region 44c of the separating element 44 or brought into direct contact with it. At least the transition region 44b of the separating element 44 is of an elastically flexible design. This can easily be achieved in that the separating element 44 is configured, for example, as a thin separating sheet, for example having a thickness smaller than 1 millimeter. This advantageously allows compensation for tolerances in the z direction shown. Advantageously, this also makes it possible that a portion 38a of the frame 38, which is to be screw-connected to a portion 32a of the battery module 32, can be brought into direct abutment on this part 32a of the battery module 32. These two parts 38a, 32a of the frame 38 and the battery module 32 can be provided by suitable screw flanges. This allows advantageously to tackle difficult screw joint cases and to simplify battery assembly significantly, without having to additionally provide any spacer elements between these flanges 38a, 32a. These individual assembly steps are once again shown in FIG. 4.

Figure 4:
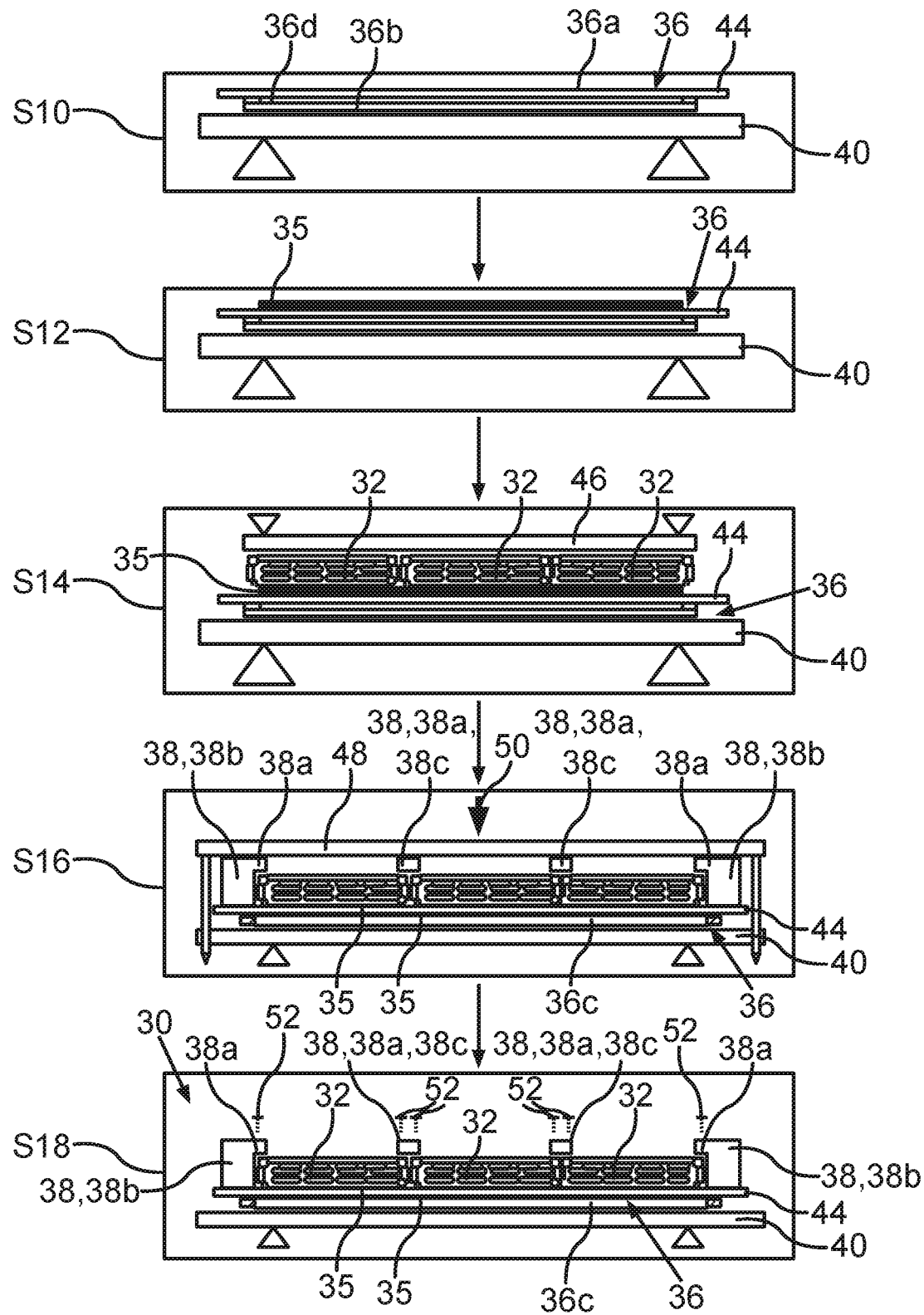
FIG. 4 shows a flowchart for illustrating a battery assembly method according to an exemplary embodiment of the invention.

FIG. 4 shows a flowchart for illustrating a battery assembly method according to an exemplary embodiment of the invention. In a step S10, a cooling means 36 is provided, particularly once again on a planar workpiece carrier 40. The cooling means 36 can be provided in different ways, for example as a cooling bottom, as illustrated herein as an example in steps S10, S12, and S14. The cooling means 36 comprises a separating element 44, which at the same time provides the first side 36a of the cooling means 36, facing the battery module 32 mounted thereon. At the same time, this separating element 44 in this example of the cooling means 36 also forms a wall of at least one cooling duct 36d of the cooling means 36 through which a coolant can flow. The at least one cooling duct 36d may be defined by another wall 36b on the side located opposite the separating element 44. Alternatively, the cooling means 36 can be configured such that the cooling means 36 has a separate cooling unit 36c, which is shown as an example in the steps S16 and S18. This cooling unit 36c can once again be configured as a cooling plate with cooling ducts extending therein, which are not explicitly shown herein. This cooling unit 36c can then be affixed to the bottom side of the separating element 44 by means of an adhesive layer 35. If a cooling means 36 configured in this manner is used for the battery arrangement 30, other assembly steps may precede the assembly step S10 described herein, in which the cooling unit 36c is initially provided, then the one adhesive layer is applied, then the separating element 44 is mounted onto it and affixed, whereby the cooling means 36 is provided, which is now the starting point for the other steps of the method, particularly method step S12. In this next method step S12, an adhesive layer 35 is applied to the top side of the cooling means 36, that is, to the first side 36a described above, particularly in a module support region 44a (see FIG. 3) of the separating element 44. In the next step S14, an arrangement of battery modules 32 is mounted onto this adhesive layer 35. It is preferred in this context that the respective battery modules 32 are not mounted individually onto the cooling means 36, but are in advance fixed in their arrangement to each other, e.g. by suitable screw connections, and then together placed onto the cooling means 36, particularly onto the adhesive layer 35 located thereon, and then affixed to the cooling means 36. Optionally, a pressing or calibrating device 46 may be used, by means of which the battery modules 32 can be slightly pressed against the cooling means 36, for example until the adhesive of the adhesive layer 35 is cured.

The pressing or calibrating device 46 can then be removed again, particularly prior to mounting the frame 38 onto the arrangement of battery modules 32 and cooling means 36 in step S16. The frame 38 can be mounted using a suitable workpiece carrier 48, for example in the joining direction 50 shown herein. In this example, this frame 38 now provides on the one hand outer walls 38*b* of a battery housing, on the other hand separating walls 38*c* arranged between battery modules 32. Both these separating walls 38*c* and the outer walls 38*b* of the frame 38 once again comprise suitable screw flanges 38*a* which are provided with suitable screw holes for screw-connecting the frame 38 and the battery modules 32 in a subsequent step S18, particularly using the screws 52 schematically shown herein. The workpiece carrier 48 can either be removed or kept during the screw-connecting process to keep the frame 38 easier in its relative position to the battery module 32. This workpiece carrier 48 is not shown in step S18 for reasons of clarity, however. The frame 38 and battery modules 32 are preferably screw-connected from above, that is, the respective screws 52 are inserted through the flanges 38*a* shown into corresponding parts, for example likewise flanges 32*a* of the battery modules 32, in a direction from the battery modules 32 towards the cooling means 16 and screw-connected. Screw connecting from below, that is, through the cooling means 16, while also conceivable, would take a greater effort and is therefore less preferred.

Figure 5:
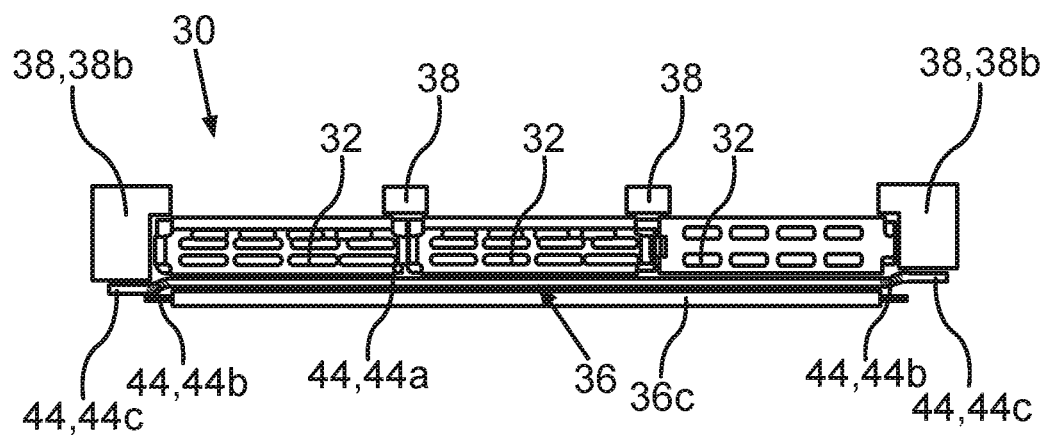
FIG. 5 shows a cross-sectional schematic view of a battery arrangement for illustrating the tolerance compensation provided by the flexible regions of the separating element, according to an exemplary embodiment of the invention.

The frame 38, particularly the side walls 38*b* of the frame 38, rest on the edge region 44*c* of the separating element 44, which is elastically and flexibly connected to the module support region 44*a* with which the battery module 32 abuts. This is the way in which advantageously the compensation for tolerances in the z direction can be represented, whereby difficult screw joint cases when screw-connecting the frame 38 to the battery modules 32 can be implemented without requiring any additional elements. FIG. 5 illustrates an example of this compensation for tolerances.

FIG. 5 shows a schematic cross sectional view of a battery arrangement 30 according to another embodiment of the invention. Particularly, the battery arrangement 30 as schematically shown in FIG. 5 can represent the result of the method as described in FIG. 4. Particularly, the respective regions 44*a*, 44*b*, 44*c* of the separating element 44 are shown in an enlarged and somewhat exaggerated view to illustrate the principle of the compensation for tolerances. As described, the separating element has a central module support region 44*a* on which the respective battery modules 32 rest.

Such a module support region 44*a* may also be provided for each respective battery module 32. A transition region 44*b* adjoins these module support regions 44*a* towards the edge of the separating element 44, which transition region connects a module support region 44*a* to the edge region 44*c* of the separating element 44. The side wall 38*b* of the frame 38 is arranged in the edge region as described. Since at least the transition region 44*b* of the separating element 44 is flexible, compensation for tolerances can advantageously be provided when mounting the frame 38 and attaching the frame 38 to the battery modules 32, which is illustrated in FIG. 5 by the separating element 44 bending into this transition region 44*b*. Once again the separating element 44 may be configured as a thin metal sheet, which allows compensation for tolerances in a particularly simple and cost-effective manner, since such a metal sheet has elastically flexible properties anyway. In this example, the cooling means 36 in addition comprises a cooling unit 36*c*, which is affixed to the bottom side of the separating element 44. The cooling unit 36*c* may likewise be provided as a cooling bottom, as described with reference to FIG. 4, for example, particularly to step S10.

The adhesive layer 35 is not explicitly shown in FIG. 5 for reasons of clarity, but it is still located between the respective battery modules 32 and the top side of the separating element 44.

Figure 6:
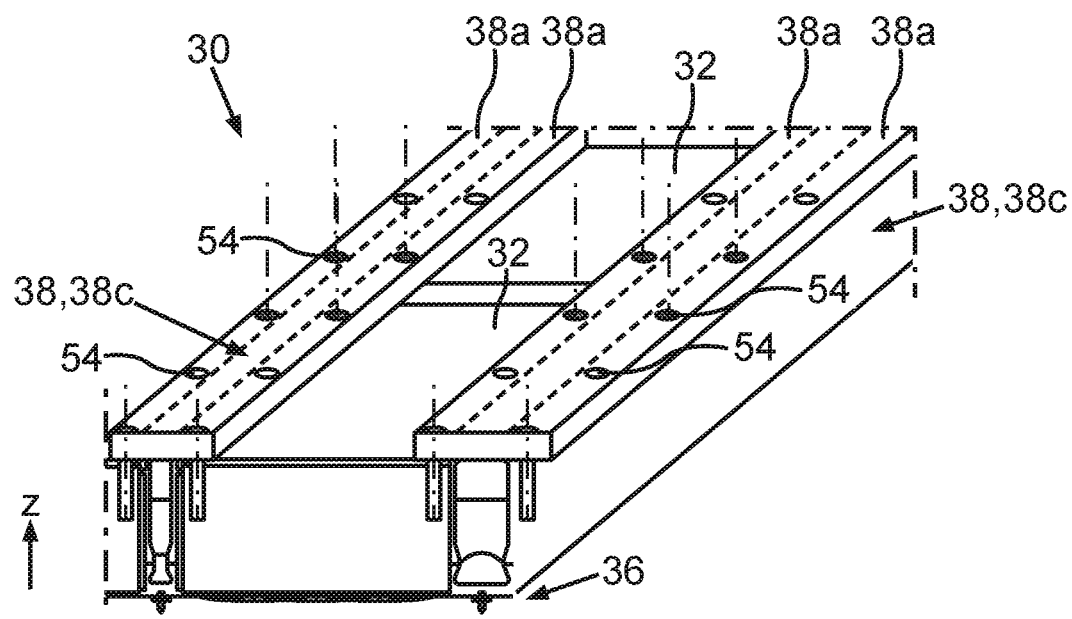
FIG. 6 shows a schematic and perspective view of a battery arrangement for illustrating fastening options between the frame and the respective battery module according to an exemplary embodiment of the invention.

FIG. 6 further shows a schematic and perspective view of a battery arrangement 30 according to another embodiment of the invention. This battery arrangement 30 likewise includes multiple battery modules 32, only two of which are shown herein as examples. Furthermore, the battery arrangement 30 again includes a frame 38 and a cooling means 36. Particularly, the battery arrangement 30 can be configured as previously described.

The geometries of the separating walls 38*c* are particularly well visible in this representation. These preferably have a T-shaped cross section and preferably a widened portion 38*a* in the z direction shown, which at the same time provides the screw flanges 38*a*. Screw holes 54 through which the screws 52 (see FIG. 4) can be inserted to attach the frame 38 to the respective battery module 32 are arranged in these widened regions 38*a*. For reasons of clarity, only some of the screw holes 54 have been assigned reference numerals. This geometry allows arranging the frame 38 and the respective battery modules 32 in a particularly installation space saving manner and makes screw-connecting them particularly easy. A particularly great advantage is that provisions can be made in the hole pattern which allow a flexible module grid. For example, numerous of such screw holes 54 can be provided along the separating web 38*c* provided by the frame 38 in the flange region 38*a*, not all of which holes must be used for screw-connecting or attaching the frame 38 to a respective battery module 32; instead, only some of these may be selected and used, for example based on the arrangement of the battery modules 32 relative to each other, e.g. based on the size of the respective battery module 32. This makes it advantageously possible to use battery modules 32 of different sizes without having to make any additional modifications on the battery housing, particularly on the frame 38, apart from the holes 54 to be provided. This is shown in greater detail in FIG. 7.

Figure 7:
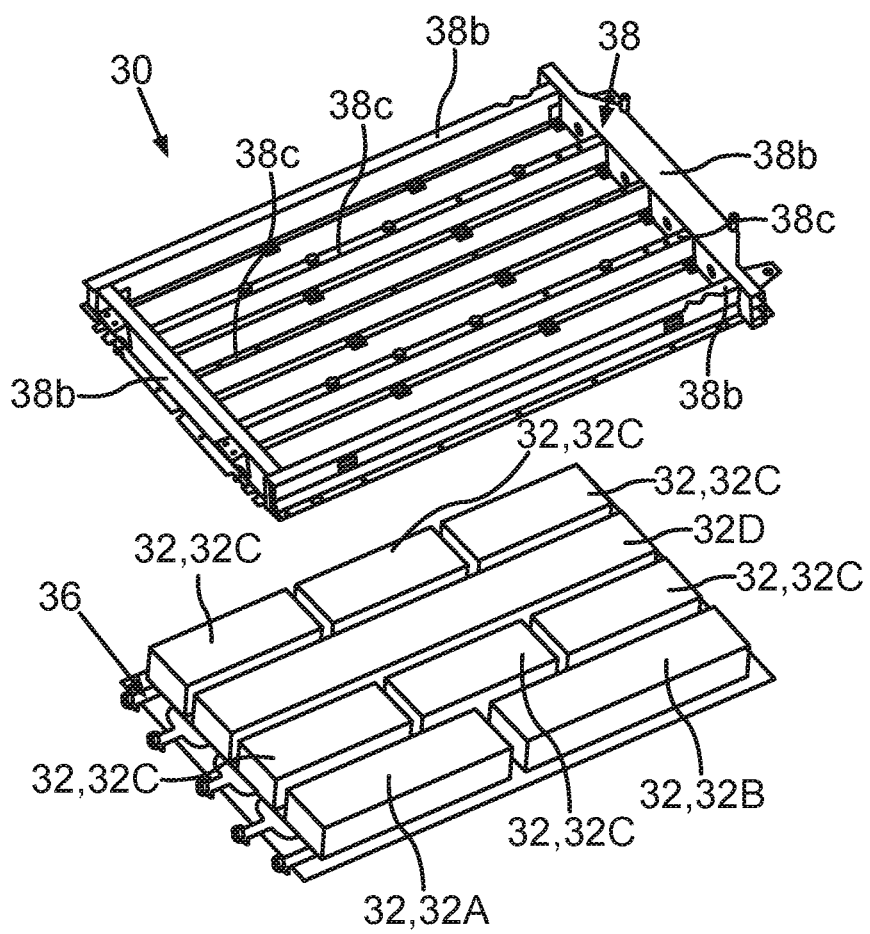
FIG. 7 shows a schematic exploded view of a battery arrangement having battery modules of different sizes, according to an exemplary embodiment of the invention.

FIG. 7 shows an exploded view of a battery arrangement 30 according to another embodiment of the invention. Particularly, FIG. 7 shows the frame 38 described with its outer walls 38*b* and respective separating walls 38*c*. In addition, the arrangement including the cooling means 36 and battery modules 32 affixed thereto can be seen again. These battery modules 32 can be of different sizes, as is also shown in FIG. 7. Particularly, it shows battery modules 32 of four different sizes. The sizes of the battery module 32 may differ with respect to their lengths while their widths and heights, that is, their extension in the z direction, are preferably the same. The shortest battery module is designated 32C, a somewhat longer battery module is designated 32A, a battery module 32B is furthermore longer than the battery module 32A, and the largest or longest battery module 32 is designated 32D. An arrangement of battery modules 32 of different sizes is advantageously made possible by the hole pattern in the frame 38 described with reference to FIG. 6.

Figure 8:
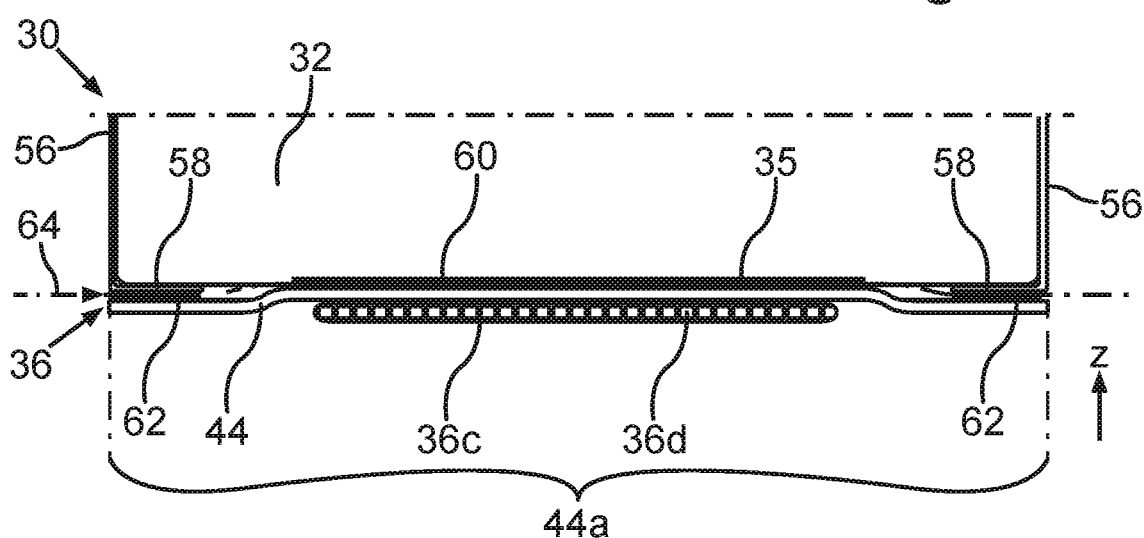
FIG. 8 shows a cross-sectional schematic view of a battery arrangement having a separating element of the cooling means which is elevated in the central module support region and having spacer elements in the edge region of the module support region between the separating element and the battery module to provide a simple severing option of battery module and separating element, according to an exemplary embodiment of the invention.

FIG. 8 shows a schematic cross sectional view of a battery arrangement 30 according to another embodiment of the invention. It once again shows an example of a battery module 32 and the cooling means 36, which once again includes the separating element 44 and a separate cooling unit 36*c* with cooling ducts 36*d* arranged thereon. The cooling means 36, particularly the separating element 44, is again affixed to the bottom side of the battery module 32 by means of the adhesive layer 35. The battery module 32 includes multiple individual battery cells, which are not shown separately in this example. These are enclosed by an enclosure 56, for example an angle iron frame for enclosing the individual cells. The enclosure 56 ex-tends underneath the battery cells as well in an edge region of the battery module 32. Therefore the bottom of the battery module 32 is elevated in the z direction in a central region 60 compared to an edge region 58. To keep the gap between the module bottom of the battery module 32, most of all in the central region 60, and the separating element 44 as small as possible, the separating element 44 may have a shape corresponding to the geometry of the module bottom. Accordingly, the separating element 44 comprises in a central region of the module support region 44a of the separating element 44, which corresponds to the central region 60 of the battery module 32, an elevation with respect to the edge region of the module support region 44a, wherein said edge region again corresponds to the edge region 58 of the battery module 32. Such an elevation in the z direction can for example be provided in a simple manner by an embossment of the separating element 44.

Furthermore, a respective spacer element 62 may be arranged between the edge region 58 of the battery module 32 and the separating element 44, particularly made of any desired material, wherein adhesive may also be arranged between such spacers or spacer elements 62 and the battery module 32 or the separating element 44, respectively. This advantageously allows particularly easy cutting out of the battery modules 32 or severing the same from the separating element 44, for example by means of a wire saw. Due to the spacer elements 62, such a hot wire can easily be inserted between the battery module 32 and the separating element 44 to cut through the connection between the battery module 32 and the separating element 44, particularly along the section line 64. These spacer elements 62 thus advantageously allow undercutting by the saw wire. Thus, the battery modules 32 can advantageously be severed again from the housing, particularly from the cooling means 36, either for servicing or for recycling of the battery arrangement 30.

Overall, the examples show that the invention facilitates an alternative battery concept, which allows elimination of the common gap fillers for tolerance compensation as well as additional tolerance compensating elements, complicated gap filler injection methods, and additional screw connections between the cooling bottom and the support structure by providing a glued module set, particularly suspended on the carrier frame, with external compensation for tolerances. The proposed concept facilitates flexible use of more flexible module sizes, above all, larger modules and in many respects an increase in cooling efficiency.

The invention claimed is:

1. A battery assembly method comprising:
at least one battery module;
a cooling means for cooling the at least one battery module that comprises a separating element as a first side, the separating element having an edge region, a module support region, and a transition region, wherein the transition region connects the edge region to the module support region; and
a frame having struts, wherein the at least one battery module is attached to the first side of the cooling means and the frame is at least attached to the at least one battery module, for attaching the at least one battery module on the first side of the cooling means, the at least one battery module is affixed on the module support region of the first side of the cooling means without the frame being attached to the cooling means, the separating element is elastically flexible, at least in the transition region, and, after the affixing of the at least one battery module, the frame is mounted on the at least one battery module and the cooling means such that at least a portion of the frame rests on the edge region of the separating element and the struts of the frame have a widened portion on a side facing away from the separating element, the widened portion comprises at least one screw hole, and at least one screw is screwed through the at least one screw hole and at least partially into, or only through a portion of, the at least one battery module for screw-connecting the frame to the at least one battery module.

2. The battery assembly method according to claim 1, wherein the separating element is provided as a metal sheet having a maximum thickness of one millimeter.

3. The battery assembly method according to claim 1, wherein multiple battery modules are affixed to the module support region of the first side of the cooling means.

4. The battery assembly method according to claim 1, wherein after mounting the frame, the frame is screw-connected to the at least one battery module and an integral portion of the frame rests in direct contact against a portion of the at least one battery module.

5. The battery assembly method according to claim 1, wherein after mounting the frame, the frame is screw-connected to the separating element in the edge region of the separating element only.

6. The battery assembly method according to claim 1, wherein the struts are configured to extend vertically at least to the module support region of the separating element, the widened portion forms a projection which, in a direction perpendicular to the extension of the struts, projects from at least a portion of the at least one battery module.

7. The battery assembly method according to claim 6, wherein in a longitudinal extension of the projection, multiple screw holes are arranged at a specific spacing from each other in the projection, and the multiple screw holes are used for screw-connecting the frame to multiple battery modules that are selected from the multiple screw holes depending on at least one of respective module sizes of the multiple battery modules and an arrangement of the multiple battery modules.

8. The battery assembly method according to claim 1, wherein the separating element is configured unevenly, such that the first side provided by the separating element is elevated in the module support region with respect to the edge region.

9. The battery assembly method according to claim 1, wherein a module bottom which faces the cooling means, after arranging the at least one battery module on the cooling means, is uneven, such that the module bottom is elevated in a central region with respect to an edge region of the module bottom.

10. A battery arrangement for a motor vehicle assembled according to the method of claim 1, wherein the battery arrangement has the at least one battery module, the cooling means for cooling the at least one battery module, and the frame, wherein the at least one battery module is attached to the first side of the cooling means and the frame is at least attached to the at least one battery module, wherein the at least one battery module is attached to the first side of the cooling means by means of an adhesive layer between the at least one battery module and the module support region of the first side of the cooling means; wherein the cooling means comprises the separating element providing the first side, which has the edge region and the transition region which connects the edge region to the module support region, wherein the separating element is elastically flexible, at least in the transition region; and wherein the frame is mounted on the arrangement of the at least one battery module and the cooling means such that at least the portion of the frame rests on the edge region of the separating element.

11. The battery assembly method according to claim 2, wherein multiple battery modules are affixed to the module support region of the first side of the cooling means.

12. The battery assembly method according to claim 2, wherein after mounting the frame, the frame is screw-connected to the at least one battery module and an integral portion of the frame rests in direct contact against a portion of the at least one battery module.

13. The battery assembly method according to claim 3, wherein after mounting the frame, the frame is screw-connected to the at least one battery module and an integral portion of the frame rests in direct contact against a portion of the at least one battery module.

14. The battery assembly method according to claim 2, wherein after mounting the frame, the frame is screw-connected to the separating element in the edge region of the separating element only.

15. The battery assembly method according to claim 3, wherein after mounting the frame, the frame is screw-connected to the separating element in the edge region of the separating element only.

16. The battery assembly method according to claim 4, wherein after mounting the frame, the frame is screw-connected to the separating element in the edge region of the separating element only.

17. The battery assembly method according to claim 2, wherein the struts are configured to extend vertically at least to the module support region of the separating element, the widened portion forms a projection which, in a direction perpendicular to the extension of the struts projects from at least a portion of the at least one battery module.

18. The battery assembly method according to claim 3, wherein the struts are configured to extend vertically at least to the module support region of the separating element, the widened portion forms a projection which, in a direction perpendicular to the extension of the struts projects from at least a portion of the at least one battery module.

19. The battery assembly method according to claim 4, wherein the struts are configured to extend vertically at least to the module support region of the separating element, the widened portion forms a projection which, in a direction perpendicular to the extension of the struts projects from at least a portion of the at least one battery module.

20. The battery assembly method according to claim 5, wherein the struts are configured to extend vertically at least to the module support region of the separating element, the widened portion forms a projection which, in a direction perpendicular to the extension of the struts projects from at least a portion of the at least one battery module.

* * * * *